May 12, 1970  J. W. HENDRY  3,511,479
REVERSE FRICTION PLASTICIZING DEVICE
Filed May 1, 1968  2 Sheets-Sheet 1
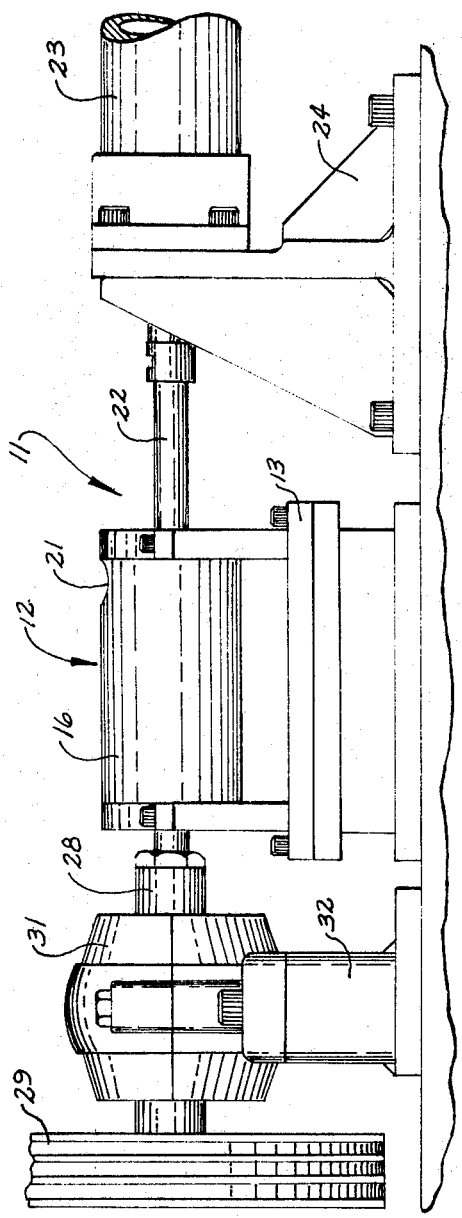
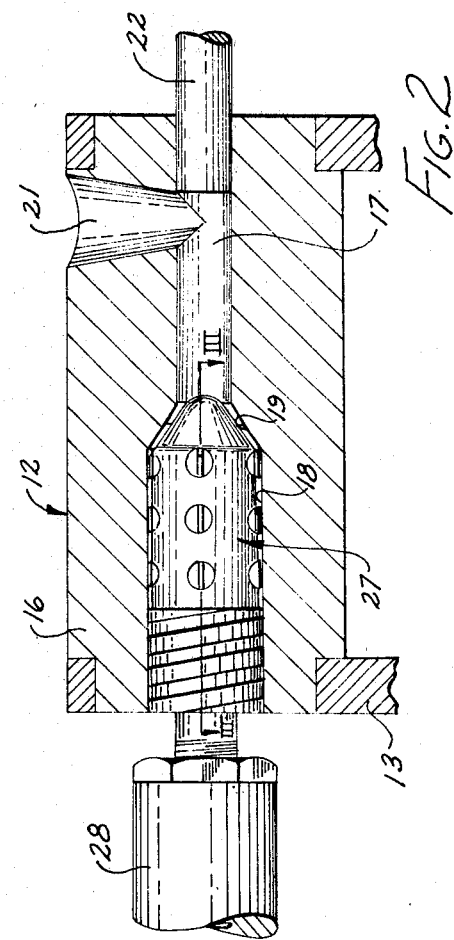
INVENTOR.
JAMES W. HENDRY
BY
Woodhams, Blanchard Flynn
ATTORNEYS May 12, 1970     J. W. HENDRY     3,511,479

REVERSE FRICTION PLASTICIZING DEVICE

Filed May 1, 1968     2 Sheets-Sheet 2

INVENTOR.
JAMES W. HENDRY
BY
Woodhams, Blanchard and Flynn
ATTORNEYS

United States Patent Office 3,511,479
Patented May 12, 1970

3,511,479
REVERSE FRICTION PLASTICIZING DEVICE
James W. Hendry, Helena, Ohio, assignor to Borg-Warner Corporation, Chicago, Ill., a corporation of Delaware
Filed May 1, 1968, Ser. No. 725,858
Int. Cl. B01f 7/02
U.S. Cl. 259—9                                                                 17 Claims

ABSTRACT OF THE DISCLOSURE

A method and apparatus for the plasticizing of materials wherein particulate plastic material is brought into contact with a first portion of a plasticizing rotor whereby relative rotation exists between the material and the first portion of the rotor so as to generate substantial frictional heat therebetween, which frictional heat causes plasticizing of the material. The material then moves past the first portion of the rotor and comes into contact with a second portion of a rotor having a plurality of lugs radially extending from the periphery thereof. The extending lugs grip the material and cause it to rotate with the rotor whereby relative rotation exists between the material and the surrounding housing, causing the generation of substantial frictional heat therebetween to further assist in plasticizing of the material.

FIELD OF THE INVENTION

This invention relates to a method and apparatus for plasticizing plastic materials and, more particularly, relates to a machine having a new and improved plasticizing rotor structure therein, said rotor having a first portion permitting relative rotation between the material and the rotor and a second portion causing the material to rotate with the rotor and relative to a surrounding housing.

DESCRIPTION OF THE PRIOR ART

Plastic materials used in injection molding, including both thermoplastic and thermosetting types, vary widely in their ability to tolerate elevated temperatures. Some otherwise desirable plastic materials, such as unplasticized polyvinyl chloride, polyoxymethylene and acrylonitrile-butadiene-styrene (ABS) copolymers are moldable only over a particular limited temperature range. Thus, careful control is required to maintain such materials in a moldable condition, since a small drop in temperature makes same unmoldable, while a small rise in temperature results in decomposition of the material, as through charring.

Such decomposition in the material has often occurred in previous plasticizing machines due to uneven working of the material. The decomposed material is often in the form of small flecks of black char entrained in the moldable material to produce a defective molded product. Since the flecks are small, a large number of such defective moldedproducts may be produced before the faulty operation of the plasticizing machine is discovered, resulting in much expensive wastage.

To provide for precise temperature control during the plasticizing operation to prevent decomposition and charring of the material, one recent plasticizing machine has employed a rotating element therein, which element has a conical portion on the end thereof, closely surrounded by a stationary seat portion. The particulate material is then forced through a small passageway between the stationary seat and the rotating conical portion whereby frictional heat is generated between the material and the surface of the conical rotor causing the material to be plasticized. Such a machine such as is illustrated in my application Ser. No. 612,676, now Pat. No. 3,358,334, has been very successful in permitting more precise control of the plasticizing operation since the rotor speed can be precisely controlled and the rotor can be intermittently operated so as to permit accurate control of the amount of frictional heat generated for performing the plasticizing operation.

However, it has been discovered that use of the above machine on certain types of plastic materials, especially highly viscous plastic materials, does not always result in a complete or uniform plasticizing of the particulate plastic material. When these machines are used on highly viscous materials, the material tends to adhere or stick to the stationary housing or seat surrounding the rotor so that relative rotation exists only between the periphery of the rotor and the adjacent periphery of the quantity of material surrounding same. Consequently, all of the frictional heat generated by the rotor is supplied to the quantity of material at the inside diameter thereof, which heat must then be transferred radially outwardly by conduction throughout the thickness of the material so as to effect complete plasticizing thereof. Thus, this tendency for the material to stick or adhere to the seat often prevents the material directly adjacent the seat from becoming completely heated and plasticized.

On the other hand, when an attempt is made to completely plasticize the material adjacent the seat by permitting the rotor to remain in rotational contact with the material for a longer period of time, thereby generating a greater amount of frictional heat, the greater amount of heat generated and applied to the inner diameter of the material may tend to char or decompose the material closely adjacent the rotor and thus destroys the purity of the material.

To overcome the above disadvantages, the annular passageways between the stationary seat and the plasticizing rotor in the above-mentioned machines have been made relatively small to permit the material contained therein to be rapidly heated throughout the thickness thereof so as to cause complete plasticizing of the material without causing charring or decomposing of the material adjacent the rotor. While this has been successful in preventing decomposition of the material, it greatly limits the amount of material which can be plasticized by the machine in any time period.

Accordingly, the objects of this invention include:

(1) To provide a new plasticizing method capable of plasticizing materials, particularly capable of plasticizing heat sensitive or highly viscous materials without appreciable damage to the material.

(2) To provide a method, as aforesaid, wherein the material is plasticized by passing same through an annular passage between a rotor and a surrounding seat, frictionally generated heat being supplied to the material both adjacent the rotor and adjacent the seat due to relative rotation existing both between the material and the seat and between the material and the rotor.

(3) To provide a method, as aforesaid, wherein frictionally generated heat is supplied to the material at the inner surface thereof due to relative rotation between the material and the rotor, the material being substantially nonrotatable with respect to the seat, the material then being rotated with respect to the seat whereby frictionally generated heat is then supplied to the external surface of the material while the material is substantially nonrotatable with respect to the rotor.

(4) To provide a method, as aforesaid, wherein the material is substantially nonrotatable during one phase of the operation to permit heat to be supplied to one surface thereof, the material being rotated during another phase of the operation to permit heat to be supplied to another surface of the material.

(5) To provide an apparatus capable of accomplishing the method as described above.

(6) To provide an apparatus, as aforesaid, wherein a plasticizing rotor is provided with a conical nose portion thereon, the rotor being additionally provided with another portion having radially projecting lugs on the periphery thereof for gripping the material and causing same to substantially rotate with the rotor.

(7) To provide an apparatus, as aforesaid, wherein the rotor is surrounded by a stationary seat with the material substantially adhering to the seat when adjacent the conical nose portion whereby frictional heat is generated and supplied to the inner surface of the material, the material also being gripped by the lugs on the rotor so as to be rotated therewith, the relative rotation between the external surface of the material and the surrounding seat causing frictional heat to be generated and supplied to the material.

(8) To provide a method and apparatus, as aforesaid, in which substantially all of the material is uniformly plasticized and in which a minimum degradation of the material exists.

(9) To provide a method and apparatus, as aforesaid, capable of successfully and uniformly plasticizing highly viscous plastic materials with a minimum of degradation.

(10) To provide a method and apparatus, as aforesaid, capable of plasticizing material at a greater rate in proportion to rotor size than was true of prior art devices.

(11) To provide an apparatus, as aforesaid, which is manufacturable in a wide variety of sizes and capacities, and in which the plasticizing operation can be uniformly and efficiently carried out while requiring only a minimum of maintenance and repair.

Other objects and purposes of the invention will be apparent to persons acquainted with machines of this general type upon reading the following disclosure and inspecting the accompanying drawings.

BRIEF DESCRIPTION OF THE DRAWINGS

In the drawings:

FIG. 1 is a partially broken side elevational view of a plasticizing machine employing therein the present invention.

FIG. 2 is an enlarged partially broken side sectional view of the plasticizing unit of FIG. 1.

Figure 3:
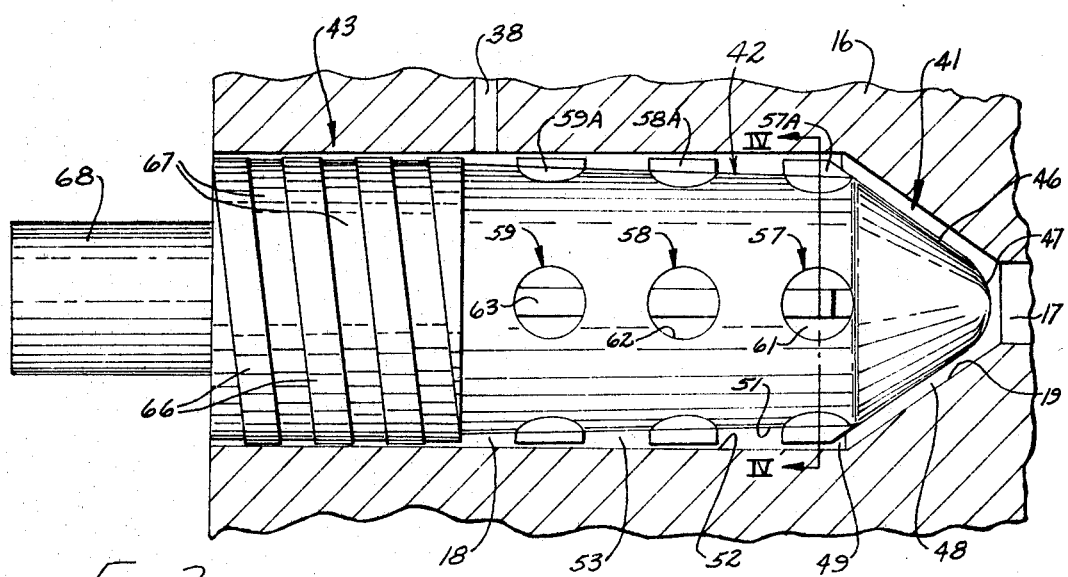
FIG. 3 is a partially broken sectional view taken along the line III—III of FIG. 2 showing the plasticizing rotor and the surrounding seat portion on an enlarged scale.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the direction of the material flow through the device and the word "rearwardly" will refer to the opposite direction. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing a plasticizing apparatus whereby particulate plastic material is fed to an annular plasticizing zone as defined by a rotor and a surrounding seat member, relative rotation existing between the rotor and the seat. The granular or particulate material is initially compressed against a conical end portion formed in the rotor, the material remaining substantially stationary with respect to the surrounding seat whereby substantial relative rotation exists between the rotor and the surrounding material, thereby generating frictional heat energy which is supplied to the inner surface of the annular quantity of material for causing partial plasticizing thereof. The material continues to move axially through the plasticizing zone and, due to the heat supplied to the inside surface thereof, becomes partially plasticized and highly viscous. The plastic material then enters a second region of the plasticizing zone wherein the plasticizing rotor is formed with projections thereon which grip the material for causing the material to rotate with the rotor, whereby substantial relative rotation exists between the surrounding seat and the external surface of such material. Accordingly, substantial frictional heat is generated and supplied to the outer surface of the material for plasticizing the remainder thereof. By sequentially heating first one surface and then the other surface of the quantity of material, the particulate plastic material is completely and uniformly plasticized throughout the thickness thereof without having to subject the material to extremely high temperatures or extremely long frictional heating cycles.

DETAILED DESCRIPTION

Referring to FIG. 1, there is illustrated a plasticizing machine 11 which is capable of performing and accommodating therein the process and apparatus of the present invention.

The plasticizing machine 11 includes therein a plasticizing unit 12 which, as illustrated in FIGS. 1 and 2, comprises a frame means 13 of any desired configuration fixedly supporting a cylindrical housing 16 thereon. The cylindrical housing 16 has a cylindrical central opening 17 formed in one end thereof communicating with and coaxially aligned with an enlarged cylindrical opening 18 formed in the other end thereof. The cylindrical openings 17 and 18 are interconnected by a tapered seat portion 19 positioned intermediate the length of the cylindrical housing 16. The housing 16 also has a feed opening 21 extending radially therethrough adjacent the rightward end thereof for allowing communication between exterior material feeding means, such as a hopper (not shown), and the central opening 17.

A ram 22 is slideably mounted within the central opening 17 for reciprocation therein, the ram being interconnected to the piston rod of a fluid power cylinder 23 fixedly mounted upon a frame means 24.

The enlarged opening 18 at the other end of the cylindrical housing 16 has a plasticizing rotor 27 mounted therein, which rotor extends beyond the leftward end of the housing and is fixedly coupled to a rotatable drive shaft 28, which shaft in turn has a drive pulley 29 fixedly secured thereto, the drive pulley 29 being driven from an external power source (not shown) by any conventional means, such as belts or chains. The drive shaft 28 is rotatably supported within an anti-friction bearing means 31 which is mounted upon a stationary pedestal 32.

In the machine as described above, particulate or granular material is deposited from a hopper through the feed opening 21 into the cylindrical opening 17. Energization of the power cylinder 23 then causes the ram 22 to move forwardly (leftwardly in FIG. 2) so as to compress the material adjacent the rotor 27. Plasticizing rotor 27, being rotatably driven by means of pulley 29 and an external power source, causes the plastic material in contact therewith to be plasticized due to the generation of frictional heat energy between the rotor and the material whereby the plasticized material then passes through the outlet passage 38 (FIG. 3) so as to be supplied to a conventional die or injection molding apparatus.

The complete structural and operational details of the plasticizing machine illustrated in FIGS. 1 and 2 is described in application Ser. No. 612,676 filed Jan. 30, 1967, now Pat. No. 3,358,334, and entitled, Plastic Working Machine Impelling Material To Be Worked Against a Rotating Cone. Accordingly, further detailed description thereof in the present application is not believed necessary.

Figure 4:
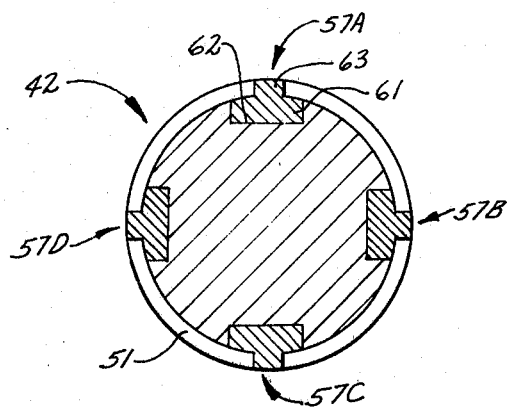
FIG. 4 is a cross-sectional view of the rotor structure taken along the line IV—IV of FIG. 3.

The method and apparatus of the present invention is best illustrated and described in conjunction with FIGS. 3 and 4 wherein there is illustrated on an enlarged scale the details of the plasticizing rotor indicated generally at 27. As shown in FIG. 3, the plasticizing rotor comprises three basic operational portions, the three portions being a conical nose portion 41 at one end thereof, an intermediate friction reversing portion 42 positioned directly behind the conical nose portion and a bearing portion 43 at the end of the rotor opposite the nose portion.

Considering the rotor structure more in detail, the conical nose portion 41 is formed with a conically tapered exterior wall 46 which diverges outwardly from the right hand end, which extreme end of the rotor is rounded so as to form a nose 47 thereon. The nose portion 41 is positioned within and closely surrounded by an annular tapered seat 19 formed within the cylindrical housing 16, the nose portion 41 being slightly spaced from the seat 19 so as to form a small annular passageway 48 therebetween. While the tapered wall 46 and the tapered seat 19 may be of the same inclination if desired, they may also be of different inclinations in order to produce different plasticizing characteristics. As is clearly illustrated in FIG. 3, the rotor 27 is coaxially and rotatably positioned within the enlarged opening 18 whereby the nose 47 on the end of the rotor is coaxial with and positioned directly adjacent the end of the cylindrical opening 17.

The intermediate portion 42 is positioned directly adjacent and is here integrally connected to the nose portion 41. The intermediate portion in this embodiment basically comprises a conical portion 51 having a slight taper on the external periphery thereof, which taper diverges outwardly from the rightward end of the rotor in substantially the same manner as the conical nose portion 41. However, whereas the taper formed on the nose portion 41 is of a relatively steep inclination, the taper formed on the intermediate conical portion 51, where such taper is used at all, is generally of a very slight inclination, generally being only a few degrees, and there may in some instances, as hereinafter further discussed, be no such taper at all. The external diameter of the portion 51 is somewhat smaller than the diameter of the enlarged opening 18, as defined by the internal wall 52, whereby a small annular passageway 53 exists therebetween, which passageway is here of diminishing thickness throughout the axial length thereof due to the taper formed on the portion 51.

Mounted on the external periphery of the intermediate portion 42 is a plurality of axially spaced radially projecting lugs or knobs 57, 58 and 59. While FIG. 3 illustrates the lugs 57, 58 and 59 as being axially aligned with one another, such axial alignment is not necessary in order to accomplish the objectives of the present invention since the lugs could be circumferentially spaced relative to one another if so desired. Further, as clearly illustrated in FIG. 4, each transverse section of the rotor is provided with a plurality of circumferentially spaced lugs extending around the periphery thereof, four such lugs 57A, 57B, 57C and 57D being illustrated in FIG. 4. The four lugs illustrated in FIG. 4 have been shown merely for purposes of illustration since any desired number of lugs could be circumferentially spaced around the periphery of the rotor if desired. For example, only one lug need be placed on the periphery of the rotor if so desired. However, use of a plurality of lugs as illustrated in FIG. 4 greatly increases the efficiency and performance of the method and apparatus of the present invention, as explained below.

Considering the specific details of one preferred form of the lug construction, each of the lugs 57, 58 and 59 is formed with a cylindrical base portion 61 positioned within a bore 62 formed in the periphery of the conical portion 51. The cylindrical base portion can be fixedly held within the bore 62 by any convenient means, such as by screws or by press fitting the base portion therein. An upstanding rib 63 is integrally formed on the base portion and projects radially beyond the periphery of the tapered portion 51. However, the height of the rib is selected so as to permit a small rotational clearance to exist between the rib and the surrounding wall 52. Further, due to the decreasing radial thickness of the passageway 53, the axially adjacent lugs are formed with different radial thicknesses as illustrated in FIG. 3 wherein the rib on the lug 57A is of a greater height than is the rib formed on the lug 58A. While FIG. 3 illustrates the ribs 63 as extending axially along the rotor structure, the ribs could be offset so as to be angularly inclined with respect to the rotor axis if desired.

The other end of the rotor 27 has the bearing portion 43 formed thereon, which portion is positioned within the end of the enlarged opening 18 and effectively acts as a rotatable bearing for supporting the rotor 27 within the housing. Further, the bearing portion 43 effectively acts as a seal member for preventing the escape of plastic material through the end of the enlarged opening 18. The bearing portion 43 is formed with a plurality of axially spaced bearing ribs 66 thereon, which ribs are in rotatable bearing engagement with the surrounding wall 52 of the enlarged opening 18. In this manner, the rotor 27 is rigidly rotatably supported within the housing 16. The bearing portion 43 is further provided with a plurality of spirally arranged grooves or recesses 67 axially spaced intermediate the bearing ribs 66, which grooves tend to minimize friction between the rotor and the surrounding housing, and further provide recesses for trapping any plastic material which passes into the bearing region and expelling it therefrom. The bearing portion is further provided with an integral projection 68 axially extending from the end thereof, which projection is fixedly coupled to the drive shaft 28 so as to permit the rotor 27 to be rotatably driven.

OPERATION

Although the operation of the device embodying the invention has been indicated somewhat above, said operation will be described in detail hereinbelow for a better understanding of the invention.

Operation of the plasticizing machine 11 embodying the present invention is initiated with the drive shaft 28 and the plasticizing rotor 27 rotating and with the feed ram 22 withdrawn to its rightward position as illustrated in FIG. 2. Material to be plasticized, which may be in a granulated or powder form, is fed from a hopper or external feed means through the feed opening 21 into the cylindrical opening or chamber 17. The feed ram 22 is then moved forwardly (leftwardly in FIG. 2) by application of pressure fluid to the power cylinder 23. The feed ram 22 forces material within the opening 17 forwardly into contact with the nose 47 of the plasticizing rotor and thence through the annular passageways 48 and 53 defining the plasticizing zone, during which passage the material is plasticized with the plasticized material then leaving the plasticized zone by means of the outlet opening 38.

Considering more in detail the plasticizing operation which occurs within the plasticizing zone as defined by the passageways 48 and 53, granular or powdered plastc material is forced from the opening 17 into contact with the nose portion 47 with the material being then forced radially outwardly through the annular passage 48. The passage 48 becomes substantially full of material so as to form an annular quantity of material. Since the material initially entering the passageway 48 is substantially granulated or powdered, and further due to the inertia possessed by the material, the material within the passageway 48 substantially remains nonrotatably fixed with respect to the surrounding seat 19. However, since the rotor 27 is rotating at a relatively high speed, a substantial relative rotation exists between the periphery 46 of the conical nose portion 41 and the internal surface of the material contained within the passageway 48. Further, since the ram 22 compresses the material against the tapered surface 46 of the rotor, substantial frictional heat is generated between the internal surface of the material and the periphery 46 of the conical nose portion 41. This heat is absorbed by the material and causes partial plasticizing thereof as same moves axially and radially outwardly through the passageway 48. Consequently, upon reaching the junction 49 between the passageways 48 and 53, the plastic material has been partially plasticized with the material directly adjacent the tapered surface 46 being substantially completely plasticized while the material adjacent the seat portion 19 is still in a somewhat less plasticized condition.

After passing beyond the junction 49, the partially plasticized material comes into contact with the intermediate friction reversing portion 42 of the rotor, which portion contains the lugs 57, 58 and 59 radially projecting therefrom. Since the material adjacent the periphery of the rotor upon entering the passageway 53 is substantially in a plasticized condition, and further since the plastic materials for which this method and machine are designed, such as those named above, possess a relatively high viscosity when in a molten plastic condition, forward axial movement (leftward in FIG. 3) of the material into the passageway 53 causes the lugs 57 to penetrate into and grip the material, causing it to rotate with the rotor 27. Consequently, the plasticized material directly adjacent the periphery of the rotor is not subjected to any further relative rotation between this adjacent material and the rotor so that no further frictional heat is supplied thereto and no overheating or decomposing of the material will occur On the other hand, since the material directly adjacent the rotor is now gripped by the lugs 57 and rotates substantially in synchronism with the rotor, a substantially relative rotation exists between the stationary wall 52 and the external surface of the quantity of material closely adjacent thereto. This relative rotation and the friction existing between the material and the wall 52 causes the generation of substantial amounts of frictional heat. The heat so generated insures a melting of plasticizing of the material closely adjacent the wall 52 if same was not completely plasticized while passing through the passageway 48. By utilizing a plurality of axially spaced lugs 57, 58 and 59 throughout the length of the passageway 53, the material within the passageway is continually forced to rotate with the rotor so as to permit maximum frictional heating and plasticizing of the material adjacent the wall 52. Further, by using a plurality of circumferentially spaced lugs 57A, 57B, 57C and 57D, a more uniform gripping of the plasticized material adjacent the rotor is insured so as to provide a more uniform and synchronous rotation of the material with respect to the rotor.

After the plasticized material has traveled forwardly to the end of the passage 53, the material is then forced outwardly through the outlet opening 38 whereby the plasticized material is fed into a conventional die or injection molding apparatus.

The annular passageway 53 is preferably tapered so as to converge as it approaches the outlet opening 38 as illustrated in FIG. 3, thereby permitting the continuous application of pressure on the material contained within the passageway due to the pressure force exerted by the ram on the material contained in the passageway 48, which force causes the material to move radially outwardly through the passageway 48 and then axially along the converging annular passageway 53. The tapered passageway 53 permits the development of a higher compression of the material within the passageway so as to result in greater frictional drag between the material and the wall 52, which in turn permits the generation of greater quantities of heat energy.

While the passageway 53 is preferably tapered as explained above, if desired, the intermediate friction reversing portion 42 of the rotor can be of a cylindrical configuration so as to result in passageway 53 having a constant or uniform opening throughout the axial length thereof. Alternatively, the wall 52 could be of a conical configuration.

Further, while any number of axially spaced or circumferentially spaced lugs can be utilized on the intermediate portion of the rotor, it is preferred to use a plurality of lugs both axially and circumferentially spaced in order to permit the most efficient gripping of the material by the rotor whereby a more complete frictional heating of the material adjacent the surrounding wall is insured. While only one specific geometry or configuration of the lugs has been illustrated and described, it will be obvious to one of ordinary skill in the art that the lugs or radial projections formed on the intermediate portion 42 could be of any shape or geometry, the only essential feature being that the lugs project radially beyond the periphery of the rotor so as to permit gripping of the stiff plasticized material.

In summary, the essential features of the present invention reside in the feeding of granular plastic material to a plasticized zone as defined between a seat and a plasticizing rotor, the material being fed adjacent the conical nose portion of the rotor whereby realtive rotation exists between the inner surface of the material and the periphery of the conical rotor, which relative rotation in combination with the frictional contact between the rotor and the material causes the generation of frictional heat energy and causes plasticizing of the material directly adjacent the rotor. The material then passes axially into a second portion of the plasticizing zone wherein it comes into contact with an intermediate portion of the rotor containing radial lugs thereon, which lugs grip the stiff plasticized material directly adjacent the rotor and cause the material to rotate therewith. Relative rotation then exists between the external surface of the material, which material is not yet completely plasticized, and the stationary walls of the surrounding chamber whereby the frictional contact therebetween causes the generation of frictional heat energy, which thus causes the complete plasticizing of the material directly adjacent the external walls. Consequently, the essential feature of the present invention resides in the reversal of friction during the plasticizing operation, the frictional heat generation first being accomplished adjacent the inner surface of the granular material, whereupon the material is then rotated substantially in synchronization with the rotor whereby the frictional heat generation then occurs adjacent the external surface of the plastic material.

While the present invention has been described and disclosed in conjunction with an apparatus which first supplies frictional heat to the inner surface and then to the external surface of the material, it will be apparent to those skilled in the art that the frictional heat reversal process of the present invention could be reversed by suitable modifications of the apparatus so as to permit the frictional heat generation to first occur at the external surface of the plastic material, with the subsequent frictional heating operation occurring at the internal surface of the material.

It should be further pointed out that, while many prior art devices utilizing rotors or torpedoes in conjunction with granular materials have possessed radial projections thereon, these projections have been provided merely to permit agitation or mixing of the material so as to permit a more complete and uniform plasticizing thereof. However, the lugs formed on the plasticizing rotor of the present invention are not provided for a mixing or agitation function. On the contrary, the lugs are provided for performing a driving function so as to cause the plasticized material to rotate substantially in synchronism with the rotor, and thus no substantial agitation function is performed.

While the plasticizing machine in FIGS. 1 and 2 has been illustrated as utilizing a ram 22 for compressing the material into the plasticizing zone, it will be apparent to those having ordinary skill in the art that any other suitable compressing means, such as a screw member, could be utilized for so driving and compressing the material.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A method for plasticizing particulate plastic material, comprising the steps of:
   feeding particulate plastic material through an axially elongated, annular plasticizing zone defined by a rotor member and a surrounding seat member, the inner and outer surfaces of said zone being defined by the rotor member and the seat member, respectively, the zone including first and second axially elongated portions in continuous communication with one another;
   rotating said rotor member relative to said seat member;
   generating frictional heat energy adjacent one of said surfaces within one of said portions of said zone for causing partial plasticizing of the material within said zone; and
   generating frictional heat energy adjacent the other of said surfaces within the other portion of said zone for causing additional plasticizing of the material within said zone.

2. A method for plasticizing particulate plastic material according to claim 1, comprising the additional steps of:
   rotating said rotor member while holding said seat member stationary;
   providing said rotor member with a first conically shaped portion and a second substantially cylindrical portion having outwardly extending projections thereon;
   one of the frictional heat energy generating steps being accomplished by rotating said material relative to said first portion for generating friction heat energy between said rotor and said material; and
   the other frictional heat energy generating step being accomplished by gripping said material with said projections for rotating said material substantially in synchronism with said rotor whereby frictional heat energy is generated between the material and said seat member.

3. A method for plasticizing particulate plastic material according to claim 1, wherein:
   one of the frictional heat generating steps is accomplished by gripping said material for rotating same as it passes through one of the portions of said plasticizing zone; and
   the other frictional heat generating step is accomplished by holding said material in a substantially nonrotatable condition as it passes through the other portion of the plasticizing zone.

4. A method according to claim 1, comprising the steps of:
   supplying sufficient particulate plastic material to said annular plasticizing zone to substantially fill both the first and second portions thereof;
   maintaining the material within said first portion as a single, substantially continuous, annular mass; and
   maintaining the material within said second portion as a single, substantially continuous, annular mass.

5. A method according to claim 4, further comprising the step of:
   discharging the material from the outlet end of said plasticizing zone in the form of a continuous single strand of plasticized material.

6. A method for plasticizing particulate plastic material, comprising the steps of:
   providing a first axially elongated, annular plasticizing zone which increases in diameter from one axial end toward the other axial end thereof and having an inlet and an outlet at opposite ends thereof with the inlet being of substantially smaller diameter than the outlet;
   providing a second axially elongated, annular plasticizing zone axially aligned with said first annular plasticizing zone and in communication with the outlet of said first annular plasticizing zone, said second annular plasticizing zone having inlet and outlet ends of substantially the same diameter;
   said first and second plasticizing zones being defined by a rotor member positioned within and spaced from a surrounding seat member, the inner and outer surfaces of said zones being defined by the rotor member and the seat member, respectively;
   feeding particulate plastic material into the inlet of said first annular plasticizing zone so as to substantially fill both said first and second zones;
   moving the material through the first zone into said second zone with the material in the first zone flowing both axially and radially outwardly as it moves from the inlet to the outlet thereof;
   generating frictional heat energy within said first zone adjacent one of said surfaces for causing partial plasticizing of the material within said first zone;
   then generating frictional heat energy within said second zone adjacent the other of said surfaces for causing additional plasticizing of the material when positioned within said second zone; and
   maintaining the material within each of said zones as a single, substantially continuous, annular mass.

7. A method according to claim 6, comprising the additional step of:
   discharging the material from the outlet end of said second annular plasticizing zone in the form of a single continuous strand of plasticized material.

8. A method according to claim 6, comprising the additional steps of:
   rotating said rotor member while holding said seat member stationary;
   holding said mass of material within said first plasticizing zone in a substantially nonrotatable condition as it passes axially through said zone for causing generation of frictional heat energy adjacent the inner surface of said first annular zone; and
   gripping said mass of material contained within said second plasticizing zone for rotating same as it axially passes through said second zone for causing generation of frictional heat energy adjacent the outer surface of said second annular zone;
   whereby substantially all of the frictional heat energy generated for causing plastification of said particulate material is generated adjacent the inner and outer surfaces of the first and second plasticizing zones, respectively.

9. An apparatus for the plasticizing of particulate plastic material, comprising:
   plasticizing rotor means;
   seat means surrounding said rotor means and being spaced therefrom to define a small annular passageway therebetween, said annular passageway functioning as a plasticizing zone and including a first axially elongated annular portion which increases in diameter from one end to the other end thereof and has an inlet at one end which is of substantially smaller diameter than the outlet located at the other end thereof, said annular passageway further including a second axially elongated annular portion axially aligned with said first portion, the second portion having inlet and outlet ends of substantially the same diameter with the inlet end being in communication with the outlet of said first portion;

means for feeding particulate plastic material into said plasticizing zone for substantially filling said first and second portions of said zone with material so as to form an annular mass of material within each of said zones;

drive means for causing relative rotation between said rotor means and seat means for causing plastification of the material contained within the plasticizing zone;

first means cooperating between said seat means and said rotor means for holding the annular mass of material within one of the portions of said plasticizing zone substantially nonrotatable relative to said seat means for permitting the development of frictional heat energy between said rotor means and said material adjacent the inner surface of said annular mass of material; and second means cooperating with said seat means and rotor means for holding the annular mass of material in the other of the portions of said plasticizing zone substantially nonrotatable relative to said rotor means for permitting the development of frictional heat energy between said material and said seat means adjacent the outer surface of said annular mass of material.

10. A plasticizing apparatus as defined in claim 9, wherein gripping means are provided for causing said plastic material to rotate in substantial synchronism with one of said rotor means and seat means relative to the other thereof.

11. A plasticizing apparatus as defined in claim 10, wherein said gripping means includes projections fixedly secured to one of said rotor means and seat means and extending outwardly therefrom into one portion of said plasticizing zone, said projections having an axial length which is small in comparison to the axial length of said one portion of said plasticizing zone.

12. An apparatus according to claim 11, wherein a plurality of projections extend into said portion of said zone in axially spaced relationship relative to one another.

13. A plasticizing apparatus as defined in claim 9, further comprising frame means with said seat means being fixedly secured thereto, said drive means being connected to and adapted to rotatably drive said rotor means, said rotor means including a first part having a substantially smooth external periphery thereon so as to permit relative rotation to exist between said rotor means and said annular mass of material located within said one portion of said plasticizing zone, said rotor means including a second part having outwardly extending projections thereon so as to grip the annular mass of plastic material located within the other portion of the plasticizing zone and cause the majority of said material to rotate substantially in synchronism with said rotor means, whereby substantial relative rotation exists between the material and the seat means for generating frictional heat energy therebetween.

14. An apparatus according to claim 13, wherein the first part of the rotor means comprises a conically shaped nose portion with the second part of the rotor being integrally connected thereto on the downstream side thereof, said second part having a substantially cylindrical periphery with a plurality of outwardly extending projections fixedly secured thereto, said material being fed into said plasticizing zone adjacent the nose of said conical portion with said material being forced progressively past the periphery of said conical portion whereby the outward projections cause the material to be gripped and rotated with the rotor means upon reaching the second part thereof.

15. A plasticizing apparatus according to claim 14, wherein the conical nose portion of the rotor means is formed with a relatively steep taper thereon, the second part of the rotor having the projections thereon also being formed with a tapered external surface with the taper thereof being relatively small in comparison to the taper formed on the conical nose portion.

16. An apparatus according to claim 15, wherein the tapered peripheries of the conical nose portion and of the second part both diverge outwardly away from the inlet end of said plasticizing zone.

17. An apparatus according to claim 14, wherein the annular plasticizing zone in the region surrounding the second part of the rotor means conically tapers so as to decrease the width of the zone as the material moves from the inlet end to the outlet end thereof.

References Cited

UNITED STATES PATENTS

| | | |
|---|---|---|
| 2,581,031 | 1/1952 | Kruzik. |
| 2,763,896 | 9/1956 | Vogt. |
| 2,779,054 | 1/1957 | Doriat et al. |
| 3,137,895 | 6/1964 | Kusch. |
| 3,319,297 | 5/1967 | Garvin et al. _____ 264—329 XR |
| 3,358,334 | 12/1967 | Hendry. |

WALTER A. SCHEEL, Primary Examiner

J. M. BELL, Assistant Examiner

U.S. Cl. X.R.

18—30; 264—68